(12) United States Patent
Sundaresan (10) Patent No.: US 11,716,379 B2
(45) Date of Patent: Aug. 1, 2023

(54) SYSTEM AND METHOD FOR CONCURRENT TRAINING AND UPDATING OF MACHINE LEARNING MODELS AT EDGE NODES IN A PEER TO PEER NETWORK

(71) Applicant: swarmin.ai, Fremont, CA (US)

(72) Inventor: Subash Sundaresan, Fremont, CA (US)

(73) Assignee: Subash Sundaresan, Fremont, CA (US)

( * ) Notice: Subject to any disclaimer, the term of this patent is extended or adjusted under 35 U.S.C. 154(b) by 302 days.

(21) Appl. No.: 17/113,083

(22) Filed: Dec. 6, 2020

(65) Prior Publication Data

US 2021/0258371 A1 Aug. 19, 2021

Related U.S. Application Data

(60) Provisional application No. 62/978,277, filed on Feb. 18, 2020.

(51) Int. Cl.
*H04L 67/104* (2022.01)
*G06N 20/00* (2019.01)
*H04L 9/32* (2006.01)

(52) U.S. Cl.
CPC ........... *H04L 67/104* (2013.01); *G06N 20/00* (2019.01); *H04L 9/3268* (2013.01)

(58) Field of Classification Search
CPC ............................. H04L 67/104; G06N 20/00
See application file for complete search history.

(56) References Cited

U.S. PATENT DOCUMENTS

| | | | |
|---|---|---|---|
| 2012/0252418 A1* | 10/2012 | Kandekar | H04W 4/021 455/414.1 |
| 2020/0380398 A1* | 12/2020 | Weider | G06F 16/285 |
| 2020/0394470 A1* | 12/2020 | Ganapavarapu | G06K 9/6228 |
| 2021/0233673 A1* | 7/2021 | Zhang | G16Y 30/10 |

* cited by examiner

*Primary Examiner* — Oleg Survillo
*Assistant Examiner* — Christopher P Cadorna (57) ABSTRACT

A method for concurrent training and updating a machine learning (ML) model at an edge node in a peer to peer network using a certifying node is provided. The method includes performing an incremental training of the ML model by a first edge node based on one or more data points associated with a data event. The first edge node ML transfers the incrementally trained ML model to the certifying node. While awaiting a response form the certifying node, the first edge node receives a certified ML model from the certifying node. The certified ML model originates from a second edge node. The first edge node performs an incremental training of the received certified ML model based on one or more data points by re-applying the data points associated with the event data. The first edge node transfers the incrementally trained ML model to the certifying node for certification.

17 Claims, 8 Drawing Sheets

SYSTEM AND METHOD FOR CONCURRENT TRAINING AND UPDATING OF MACHINE LEARNING MODELS AT EDGE NODES IN A PEER TO PEER NETWORK

CROSS-REFERENCE TO RELATED APPLICATIONS

This patent application claims priority to U.S. provisional patent application Ser. No. 62/978,277, filed on Feb. 18, 2020 and is related to U.S. provisional patent application Ser. No. 62/965,099, filed on Jan. 23, 2020, U.S. provisional patent application Ser. No. 62/972,590, filed on Feb. 10, 2020, U.S. provisional patent application Ser. No. 62/972,580, filed on Feb. 10, 2020, U.S. provisional patent application Ser. No. 62/978,280, filed on Feb. 18, 2020 the complete disclosures of which, in their entireties, are hereby incorporated by reference.

BACKGROUND

Technical Field

Embodiments of this disclosure generally relate to training machine learning models, and more particularly, to a system and a method for concurrent training and updating a machine learning model at edge nodes in a peer to peer network using a certifying node.

Description of the Related Art

Machine learning techniques are typically used to build a model or a rule set to predict a result based on values of one or more features. Machine learning techniques typically involve use of a data set that includes, for each record, a value for each of a set of features, and a result. A model or rule set for predicting a result is developed based on the data set. Machine learning techniques generally build on statistical underpinnings. Statistical approaches test a proposed model against a set of data. Machine learning techniques search through a space of possible models, to find the best model to fit a given set of data used for various commonly seen use cases such as personalization of user experiences, recommendation of products, medical diagnosis, and the like.

Figure 1:
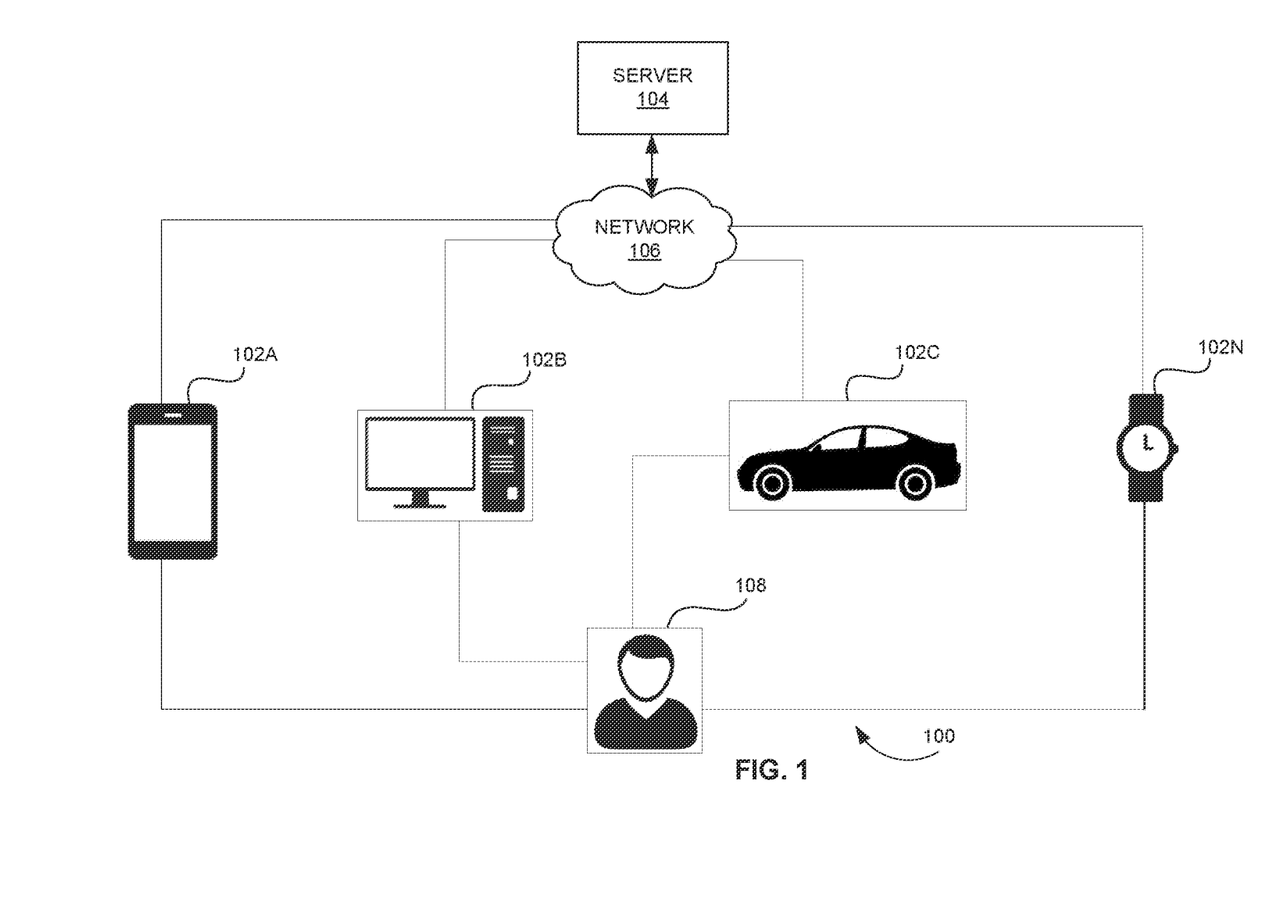
FIG. 1 illustrates a network architecture for machine learning on a server.

Typically, machine learning techniques follow a data flow architecture that involves sending data from usage of relevant applications or websites by end users of edge nodes to a central server, where the edge nodes may include devices such as smartphones, tablets, computers, smart watches, internet of things (IoT) devices, connected vehicles, and the like. The server aggregates all the data gathered from the edge nodes and uses the aggregated data to train a machine learning (ML) model. The trained ML model is subsequently used for making decisions, such as for example personalization or product recommendations, medical diagnosis and the like. An example of a typical network environment 100 for machine learning is depicted in FIG. 1. Typically, data associated with one or more users 108A-N, including for example, data associated with usage of applications or websites is transferred to a server 104 via a network 106. The server aggregates all the data received and a machine learning (ML) model is trained at the server 104 based on the aggregated data. The trained ML model is subsequently used for making decisions for various technical purposes, such as for example, for personalization of user experience, for providing product recommendations, medical diagnosis, and the like.

However, the above described architecture for training an ML model has several disadvantages. For instance, sending data associated with the users to the server 104 causes privacy and/or security concerns as the data may be shared with and/or used by third parties without the consent of the users and, data on the server 104 may be hacked by malicious actors, thereby causing data leaks. Due to the privacy and data security concerns such as those mentioned above, many owners of application and websites may be reluctant to share such valuable data with the server 104, thereby potentially denying the benefits that ML models based on that data can provide to end users, such as, for example, being able to diagnose diseases based on medical data signals. Moreover, traditional techniques of training the ML model known in the art involve slow learning and are not continuous, as the aggregation of data and updating of the training of the ML models is typically done periodically.

SUMMARY

In view of the foregoing, an embodiment herein provides a first edge node that is configured to be coupled in communication via a peer to peer network with other edge nodes. The peer to peer network includes a certifying node. The first edge node and the other edge nodes are configured to train concurrently and to update a machine learning (ML) model at the first edge node. The first edge node is configured to (i) perform an incremental training of a ML model, based on one or more data points associated with an occurrence of one or more data events at the first edge node, (ii) transfer the incrementally trained ML model to the certifying node for certification, the incrementally trained ML model includes one or more parameters and one or more weights associated with the one or more parameters, (iii) receive a certified ML model from the certifying node while awaiting a response from the certifying node to transfer the incrementally trained ML model, the certified ML model is originated from a second edge node of the peer to peer network and is generated by the certifying node by performing a certification based on one or more certification parameters, (iv) perform the incremental training of the ML model at the first edge node, based on the one or more data points by re-applying the one or more data points to generate a new version of the incrementally trained ML model at the first edge node, and (v) transfer the new version of the incrementally trained ML model by the first edge node to the certifying node of the peer to peer network for certification.

In some embodiments, the first edge node is configured to register with the certifying node for certification of the incrementally trained ML model.

In some embodiments, the first edge node is configured to receive an encrypted identifier token from the certifying node as a proof of authenticity for registering with the certifying node.

In some embodiments, the first edge node is configured to avoid overwrite the certified ML model. The certifying node verities each data updated to a first version of ML model that is layered on top of the new version of the incrementally trained ML model based on an encrypted data that specifies a base model version from which the first version of the ML model is derived.

In some embodiments, the first edge node is configured to generate a persistent file format of the incrementally trained ML model by removing one or more details associated with the plurality of data points.

In some embodiments, the first edge node is configured to encrypt the persistent file format with a unique signature that corresponds to the first edge node to enable authentication to the other edge nodes in the peer to peer network to access the incrementally trained ML model.

In some embodiments, the first edge node is configured to encapsulate unique metadata associated with the one or more data points to restrict the training of the one or more data points used in the incrementally trained ML model for the new version of the incrementally trained ML model.

In some embodiments, the first edge node is configured to optimize a payload associated with the persistent file format by including the one or more parameters and the one or more weights that crosses above a predetermined configurable threshold, the one or more weights are associated with the one or more parameters.

In some embodiments, the payload associated with the persistent file format is optimized by, (i) extracting the one or more parameters and the one or more weights associated with the one or more parameters from specific data items; and (ii) determining if the one or more weights associated with the one or more parameters beyond the predetermined configurable threshold.

In one aspect, there is provided a method for operating a first edge node that is configured to be coupled in communication via a peer to peer network with other edge nodes. The peer to peer network includes a certifying node. The first edge node and the other edge nodes are configured to train concurrently and to update a machine learning (ML) model at the first edge node. The method includes, configuring the first edge node to (i) perform an incremental training of a ML model, based on one or more data points associated with an occurrence of one or more data events at the first edge node, (ii) transfer the incrementally trained ML model to the certifying node for certification, the incrementally trained ML model includes one or more parameters and one or more weights associated with the one or more parameters, (iii) receive a certified ML model from the certifying node while awaiting a response from the certifying node to transfer the incrementally trained ML model, the certified ML model is originated from a second edge node of the peer to peer network and is generated by the certifying node by performing a certification based on one or more certification parameters, (iv) perform the incremental training of the ML model at the first edge node, based on the one or more data points by re-applying the one or more data points to generate a new version of the incrementally trained ML model at the first edge node, and (v) transfer the new version of the incrementally trained ML model by the first edge node to the certifying node of the peer to peer network for certification.

In some embodiments, the method comprises configuring the first edge node to register to the certifying node for certification of the incrementally trained ML model.

In some embodiments, wherein the method comprises configuring the first edge node to receive an encrypted identifier token from the certifying node as a proof of authenticity for registering with the certifying node.

In some embodiments, wherein the method comprises configuring the first edge node to avoid overwrite the certified ML model. The certifying node verifies each data updated to a first version of ML model that is layered on top of the new certified ML model based on an encrypted data that specifies a base model version from which the first version of the ML model is derived.

In some embodiments, the method comprises configuring the first edge node to generate a persistent file format of the incrementally trained ML model by removing one or more details associated with the plurality of data points.

In some embodiments, the method comprises configuring the first edge node to encrypt the persistent file format with a unique signature that corresponds to the first edge node to enable authentication to the other edge nodes in the peer to peer network to access the incrementally trained ML model.

In some embodiments, the method comprises configuring the first edge node to encapsulate unique metadata associated with the one or more data points to restrict the training of the one or more data points used in the incrementally trained ML model for the new version of the incrementally trained ML model.

In some embodiments, the method comprises configuring the first edge node to optimize a payload associated with the persistent file format by including the one or more parameters and the one or more weights that crosses above a predetermined configurable threshold, the one or more weights are associated with the one or more parameters.

In another aspect, there is provided a second edge node that is configured to be coupled in communication via a peer to peer network with a first edge node. The peer to peer network includes a certifying node. The first edge node and the second edge node are configured to train concurrently and to update a machine learning (ML) model at the second edge node. The first edge node is configured to perform incremental training of the ML model, based on one or more data points associated with an occurrence of one or more data events at the first edge node and transfer an incrementally trained ML model to the certifying node of the peer to peer network. The incrementally trained ML model includes one or more parameters and one or more weights associated with the one or more parameters. The second edge node is configured to (i) initiate a certified ML model version of the incrementally trained ML model that is generated by the certifying node by performing a certification based on a plurality of certification parameters and the first edge node receives the certified ML model version of the incrementally trained ML model while awaiting a response from the certifying node to transfer the incrementally trained ML model, and (ii) obtain a generated new version of the incrementally trained ML model after performing the certification by the certifying node, wherein the first edge node re-applies the plurality of data points for the incremental training of the certified ML model.

In another aspect, there is provided a method for operating a second edge node that is configured to be coupled in communication via a peer to peer network with a first edge node. The peer to peer network includes a certifying node. The first edge node and the second edge node are configured to train concurrently and to update a machine learning (ML) model at the second edge node. The first edge node is configured to perform incremental training of the ML model, based on one or more data points associated with an occurrence of one or more data events at the first edge node and transfer an incrementally trained ML model to the certifying node of the peer to peer network. The incrementally trained ML model includes one or more parameters and one or more weights associated with the one or more parameters. The method includes configuring the second edge node to (i) initiate a certified ML model version of the incrementally trained ML model that is generated by the certifying node by performing a certification based on a plurality of certification parameters and the first edge node receives the certified ML model version of the incrementally trained ML model while awaiting a response from the certifying node to transfer the incrementally trained ML model, and (ii) obtain a generated new version of the incrementally trained ML model after performing the certification by the certifying node, wherein the first edge node re-applies the plurality of data points for the incremental training of the certified ML model.

In another aspect, there is provided a computer program product comprising a non-transitory computer-readable storage medium having computer-readable instructions stored thereon, computer-readable instructions being executable by a computerized device comprising processing hardware to execute any of the above method.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method for concurrent training and updating a machine learning model at an edge node in a peer to peer network using a certifying node. The embodiments herein achieve this by proposing a concurrent training and updating an edge node machine learning model system that concurrently trains and updates all edge nodes with a certified ML model in the peer to peer network. Referring now to the drawings, and more particularly to FIGS. 2 through 6, where similar reference characters denote corresponding features consistently throughout the figures, there are shown preferred embodiments.

Figure 2:
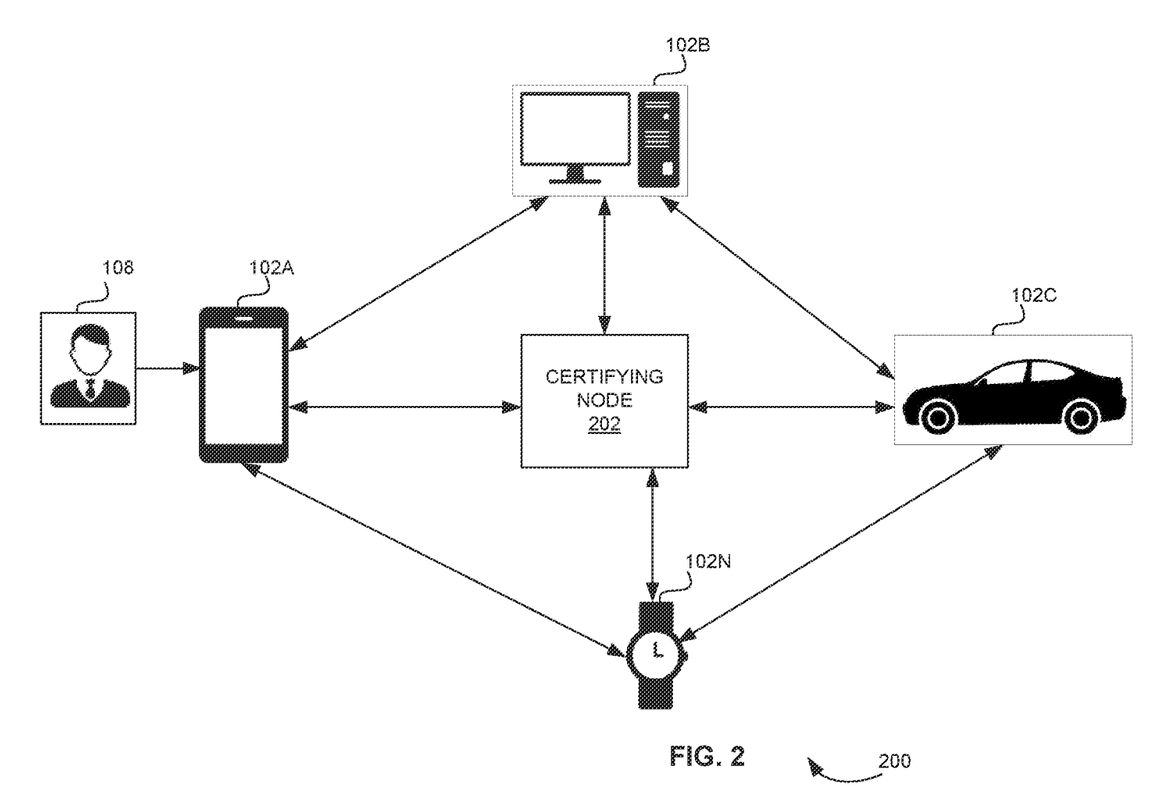
FIG. 2 illustrates a schematic diagram of a system for concurrent training and updating a machine learning model at an edge node in a peer to peer network, according to some embodiments herein.

FIG. 2 illustrates a schematic diagram of a system for concurrent training and updating a machine learning model at an edge node in a peer to peer network, according to some embodiments herein. In some embodiments, the peer to peer network of devices 200 may include, a single network or a combination of different networks. Examples of the peer to peer network of devices 200, may include but are not limited to, a local area network (LAN), a wide area network (WAN), a public network, a private network, a proprietary network, a Public Telephone Switched Network (PSTN), the Internet, a wireless network, a virtual network, or any combination thereof. The peer to peer network of devices 200 includes one or more edge nodes 102A-N communicatively coupled to one another to enable concurrent training of one or more ML models at the one or more edge nodes 102A-N. The certifying node 202 may be communicatively coupled with the one or more edge nodes 102A-N to regulate the process of concurrent training of one or more ML models. Examples of the edge nodes 102A-N include, but are not limited to, smartphones, tablets, computers, smart watches, IoT (Internet of Things) devices, connected vehicles, and the like.

In some embodiments, edge nodes 102A-N may also include various network access points, such as, wired or wireless access points including base stations, internet exchange points or any other type of entity having computation and networking capabilities. In some embodiments, each of the edge nodes 102A-N registered with the peer to peer network of devices 200 may receive a base version of an ML model. In some embodiments, the base version of the ML model may be generated by each of the edge nodes 102 A-N using an authorized program. In some embodiments, the ML model may include one or more parameters and one or more weights associated with the parameters. Examples of the parameters may include, but are not limited to gender, age, location, and a category of content on a website app, and the like. The weights indicate an amount of importance the respective parameters are given in the decisions made by the ML model. For example, gender may have a weight of 0.4, while age may have a weight of 0.3. Upon occurrence of a data event at any of the edge nodes 102A-N, the base version of the ML model is incrementally trained by the respective edge nodes.

The data event may include, for example data associated with user inputs to particular applications, such as for example usage of the relevant app/website by the end users (such as user 108). In some embodiments, each of the edge nodes incrementally trains the base version of the ML model upon occurrence of a data event at the respective edge nodes. The incremental training is performed by updating one or more weights associated with the one or more parameters of the ML model during a predetermined window of time. The predetermined window of time may include, for example, one individual event or a short batch of events. In some embodiments, the predetermined window of time may be configurable. The incrementally trained ML models may be subsequently used for making decisions, for example for personalization or product recommendations or medical diagnosis. In some embodiments, the updates are applied in real-time on receipt of an event data. The incremental training of the ML models enables machine learning to happen in real-time, as soon as the data event occurs on the edge nodes thereby improving the quality of the decisions made by the ML model.

The ML model comprises learnings based on data previously seen by other edge nodes in the peer to peer network of devices. In some embodiments, the learnings are devoid of an underlying event data used to generate an incrementally trained version of the ML model. During the incremental training process described herein, a previous version of the ML model may be used as a baseline, or if no such previous version of the ML model is available, then a base version of the ML model may be generated. In some embodiments, the edge nodes 102A-N may receive an ML model comprising net learnings based on data previously seen by other edge nodes in the peer-peer network of devices 200, but without their underlying event data and such an ML model may constitute the previous, or base version of the ML model on which each edge node incrementally applies one or more training updates based on their respective event data.

The incrementally trained ML models may be used for various purposes, such as for example, sensitive health signals that are available to an application on a wearable device such as, a smart watch may be used to train ML models that may enable prediction of a user's probability of getting a disease, without being concerned about security/privacy issues associated with sending sensitive data to a server.

In some embodiments, the certifying node may be configured to enable registration of edge nodes with the peer to peer network of devices 200. In some embodiments, each edge node is configured to register with the certifying node 202 while joining the peer to peer network of devices 200. The certifying node 202 may provide an encrypted key to each edge node that is subsequently used to authenticate any subsequent requests/updates from the respective edge node. In some embodiments, the certifying node 202 is configured to evaluate the legitimacy of the edge nodes 102A-N, and if deemed okay, the certifying node 202 issues an encrypted identifier token to the edge nodes 102A-N. The encrypted token identifier serves as a proof of authenticity of the edge nodes 102A-N and prevents tampering in one or more subsequent interactions with the respective edge nodes 102A-N.

In some embodiments, the certifying node 202 uses an encrypted data to verify a base version of the ML model version from which any received updated version of the ML model was derived. In some embodiments, one or more edge nodes use the updated certified versions of the ML model to re-apply their incremental training in addition and resubmit the retrained versions to the certifying node 202 for certification.

In some embodiments, the first edge node is configured to generate a persistent file format of the incrementally trained ML model by removing one or more details associated with the plurality of data points.

In some embodiments, the first edge node is configured to encrypt the persistent file format with a unique signature that corresponds to the first edge node to enable authentication to the other edge nodes in the peer to peer network to access the incrementally trained ML model.

In some embodiments, the first edge node is configured to encapsulate unique metadata associated with the one or more data points to restrict the training of the one or more data points used in the incrementally trained ML model for the new version of the incrementally trained ML model.

In some embodiments, the first edge node is configured to optimize a payload associated with the persistent file format by including the one or more parameters and the one or more weights that crosses above a predetermined configurable threshold, the one or more weights are associated with the one or more parameters.

In some embodiments, the first edge node is configured to the payload associated with the persistent file format is optimized by, (i) extracting the one or more parameters and the one or more weights associated with the one or more parameters from specific data items; and (ii) determining if the one or more weights associated with the one or more parameters beyond the predetermined configurable threshold.

For instance, if an edge node $E_i$ had previously incrementally trained an ML model version on one or more locally available data points $D_{i1}$, $D_{i2}$, up to $D_{in}$, and had submitted an incremental model version $E_i$ $V_j$ to the certifying node 202, while awaiting a response to the submission from the certifying node 202, the edge node $E_i$ receives a new certified model version, $E_k$ $V_1$ (that originated from another edge node $E_k$) from the certifying node 202. The edge node $E_i$ retrains on top of the newly received version ML model, and reapplies data points $D_{i1}$, $D_{i2}$, up to $D_{in}$ to generate a new incremental version of the ML model $E_i$ $V_{j+1}$ to send to the certifying node 202 for certification.

Figure 3A:
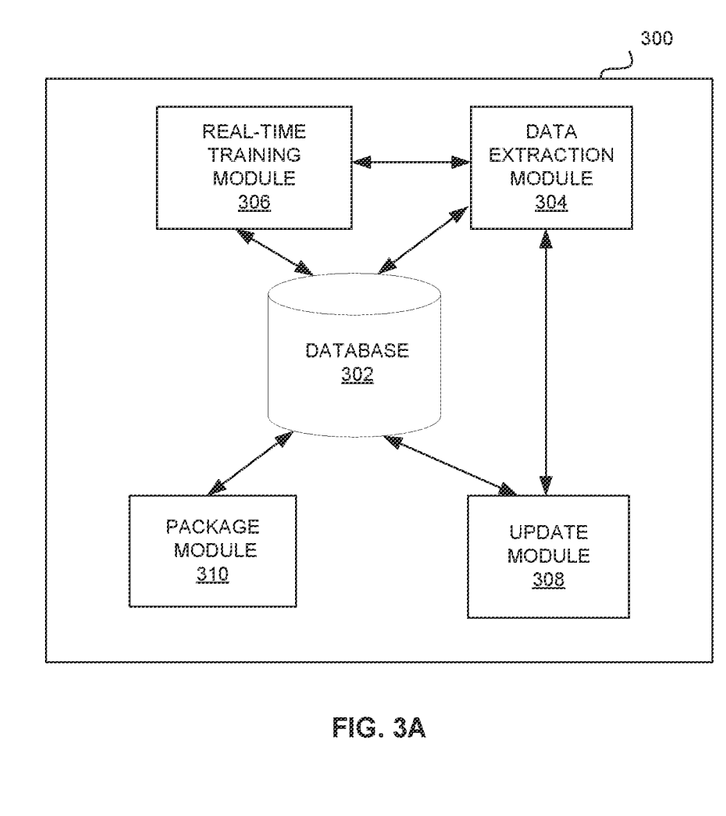
FIG. 3A illustrates a block diagram of a concurrent training and update unit associated with one or more edge nodes of the peer to peer network of FIG. 2, according to some embodiments herein.

FIG. 3A illustrates a block diagram of a concurrent training unit 300 associated with one or more edge nodes of the peer to peer network of FIG. 2, according to some embodiments herein. In some embodiments, the concurrent training unit 300 may be implemented in one or more edge nodes 102A-N. In some embodiments, the concurrent training unit 300 includes one or more of a data extraction module 304, a real-time training module 306, an update module 308, and a package module 310 communicatively associated with a database 302. In various embodiments, the concurrent training unit 300 may be implemented as a software development kit (SDK) that may be configured to get associated with one or more applications on the edge nodes 102A-N. The data extraction module 304 is operable to generate a base version of the ML model on each of the edge nodes 102A-N using an authorized program. In some embodiments, the data extraction module 304 generates the base version of the ML model comprising leanings based on data previously seen by edge nodes in the peer to peer network of devices 200 by removing any underlying event data and retaining one or more parameters and one or more weights associated with the parameters. A base version of the ML model may include one or more parameters and one or more weights associated with the parameters. Examples of the parameters may include, but is not limited to gender, age, location, the category of the content on the website/app, and the like. The weights indicate an amount of importance the respective parameters are given in the decisions made by the ML model. For example, gender may have a weight of 0.4, while age may have a weight of 0.3.

In some embodiments, the real-time training module 306 incrementally trains a base version of the ML model at each of the edge nodes 102A-N upon occurrence of a data event at the respective edge nodes 102A-N. The incremental training is performed by updating one or more weights associated with the one or more parameters of the ML model during a predetermined window of time. The predetermined window of time may include, for example, one individual event or a short batch of events. In some embodiments, the predetermined window of time may be configurable. In some embodiments, the updates are applied in real-time on receipt of an event data. The ML model comprises learnings based on data previously seen by other edge nodes in the network environment. In some embodiments, the learnings are devoid of an underlying event data used to generate the incremental version of the ML model. During the incremental training process described herein, a previous version of the ML model may be used as a baseline, or if no such previous version of the ML model is available, then a base version of the ML model may be generated and/or used.

In some embodiments, the package module 310 is configured to share the updated weights associated with parameters and/or the parameters of the incrementally trained ML model from each edge node to one or more other edge nodes in the peer to peer network of devices 200. In some embodiments, the weights and/or the parameters shared between the edge nodes are devoid of any of the underlying data items used to generate the incremental version of the ML model, such as the event data, thereby ensuring data security.

In some embodiments, the update module 308 is configured to update an ML model available on each of the edge nodes based on the updated weights received from the real-time incremental training of the ML model at other edge nodes of the peer to peer network of devices 200. During a first instance, a base version of the ML model available at the edge nodes may be updated based on the updated weights and or parameters received from other edge nodes. Upon subsequent receipts of the weights and/or parameters from other edge nodes, the update module 308 may update the updated version of the ML model. The real-time training module 306 incrementally trains the updated ML model upon occurrence/receipt of a data event at each of the edge nodes. For example, upon receiving a user selection of purchase items in an application in a mobile phone of a user, the user device incrementally trains the updated ML model based on the data associated with user selection.

Figure 3B:
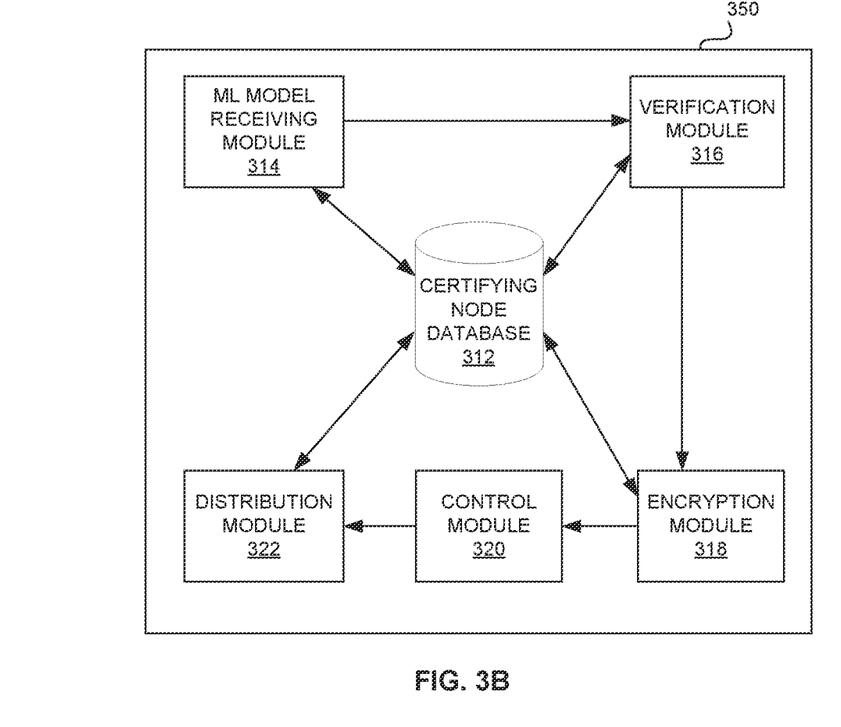
FIG. 3B illustrates an exploded view of a certification and training unit associated with a certifying node of the peer to peer network of devices, according to some embodiments herein.

FIG. 3B illustrates an exploded view of a certification and training unit 350 associated with the certifying node 202 of the peer to peer network of devices, according to some embodiments herein. In one embodiment, the certification and training unit 350 includes an ML model receiving module 314, a verification module 316, an encryption module 318, a control module 320, a distribution module 322 associatively coupled to a certifying node database 312. The ML model receiving module 314 receives a machine learning model from one or more edge nodes 102A-N in the peer to peer network over the network. In some embodiments, the machine learning model is an incrementally trained machine learning model. In some embodiments, the machine learning model includes one or more parameters and one or more weights associated with the one or more parameters.

The verification module 316 receives the base ML model of one or more edge nodes 102A-N for certification. In some embodiments, the verification module 316 ensures each update to the machine learning model is layered on top of the last certified machine learning model to avoid overwriting of previously certified machine learning model by the edge node. In some embodiments, the verification module 316 further maintains a record of a number of data points used by each edge node for incrementally training the machine learning model to prevent undue contribution by each edge node in incremental training of the machine learning model. In some embodiments, a unique encrypted signature may be used to ensure that the data points used by each edge node for incrementally training the machine learning model have not been re-used for incremental training. The verification module 316 provides the unique encrypted signature for each data item associated with a data event occurring at each of the edge nodes. In some embodiments, the one or more modules in the certifying node 202 may be implemented as hardware components such as electronic chips, electronic circuits etc.

The encryption module 318 encrypts a format of the ML model used to transmit the incrementally updated version of the ML model from an edge node to the rest of the edge nodes 102 A-N to prevent injections of unauthorized versions of the ML model by malicious actors into the peer to peer network of devices 200. The encryption provides an authentication to confirm that a version of the ML model originated from a legitimate edge node in the peer to peer network of devices 200. The encryption may include data that specifies a base version of the ML model from which an updated version of the ML model is derived from. In some embodiments, the certifying node 202 verifies the encrypted format of the ML model received from each edge node to verify that any new version of the ML model must be derived from a latest certified model version. The certifying node 202 verifies this using encrypted data that specifies a base model version from which an ML model version was previously derived. The control module 320 imposes a limit on the proportion of an incremental training imparted on the ML model cumulatively contributed by each edge node so that the one or more edge nodes of the peer to peer network of devices 200 are prevented from levying unduly excessive influence by providing updates to the ML model using an abnormally high number of data points. The limit imposed also enables prevention of denial of service (DoS) attacks or any such attempt by any one edge node to flood the peer to peer network with its requests, or submissions of new version of the ML models. The distribution module 322 distributes certified machine learning model to all the edge nodes in the peer to peer network for real-time incremental training of the certified machine learning model as well as for real time decision making.

Although the present embodiments have been described with reference to specific example embodiments, it will be evident that various modifications and changes may be made to these embodiments without departing from the broader spirit and scope of the various embodiments, for example, the various modules, such as the real-time training module 306, the data extraction module 304, update module 308, package module 310, control module 320, verification module 316, encryption module 318, ML model receiving module 314, and distribution module 322 described herein may be enabled and operated using a firmware, software and/or hardware circuitry (e.g., CMOS based logic circuitry) or any combination of hardware, firmware, and/or software (e.g., embodied in a machine readable medium). Also, various network devices, units and methods disclosed herein may be embodied using transistors, logic gates, and electrical circuits (e.g., Application Specific Integrated (ASIC) Circuitry and/or in Digital Signal Processor (DSP) circuitry). Also, various modules described herein and their associated functionalities may be distributed across network devices belonging to different communication networks.

The software may be transmitted and/or received over a network via, or through the network interface unit. The term "machine-readable medium" may be construed to include a single medium and/or multiple media (e.g., a centralized and/or distributed database, and/or associated caches and servers) that store the one or more sets of instructions. Moreover, the term "machine-readable medium" may be construed to include any medium that is capable of storing, encoding and/or carrying a set of instructions that may be executed by a network device such that the execution of these instructions causes the network device to perform one or more of the methodologies of the various embodiments. Furthermore, the term "machine-readable medium" may be construed to include, but shall not be limited to, solid-state memories, optical and magnetic media, and carrier wave signals.

Figure 4A:
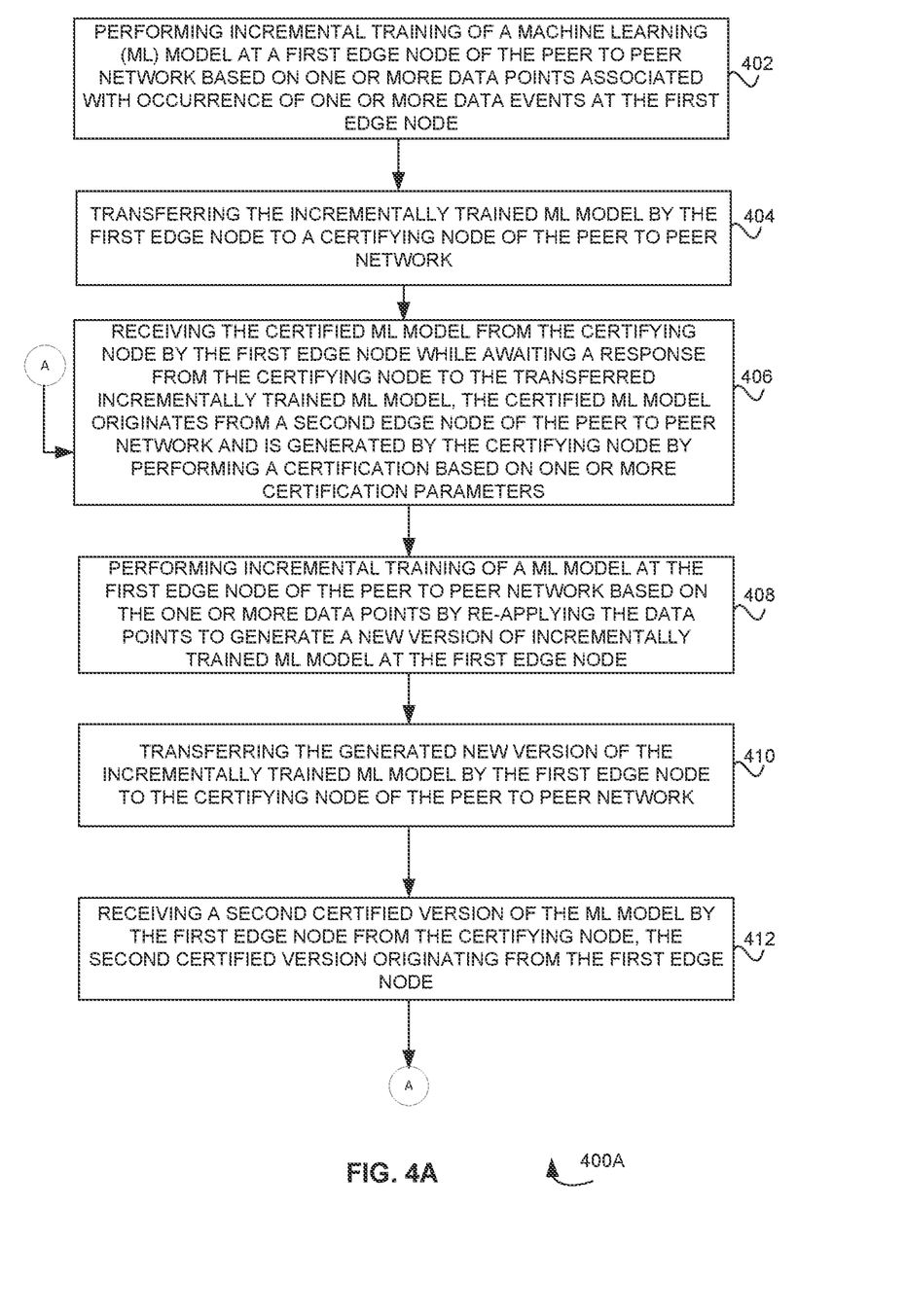
FIG. 4A is a flow diagram that illustrates a method of concurrent training and updating a machine learning model at an edge node in a peer to peer network, according to some embodiments herein.

FIG. 4A is a flow diagram that illustrates a method 400A of concurrent training and updating a machine learning model at an edge node in a peer to peer network, according to some embodiments herein. At step 402, the method 400A includes performing incremental training of a machine learning (ML) model at a first edge node of the peer to peer network, based on one or more data points associated with occurrence of one or more data events at the first edge node. At step 404, the method 400A includes transferring the incrementally trained ML model by the first edge node to a certifying node of the peer to peer network. In some embodiments, the incrementally trained ML model includes one or more parameters and one or more weights associated with the one or more parameters. At step 406, the method 400A includes receiving a first certified ML model from the certifying node by the first edge node while awaiting a response from the certifying node to the transferred incrementally trained ML model, the certified ML model originates from a second edge node of the peer to peer network and is generated by the certifying node by performing a certification based on one or more certification parameters.

In some embodiments, the certifying node 202 benchmarks each update received, in order to make sure that one or more predictions associated with ML model based on the event data match with one or more previously known metrics and that the predictions are within an acceptable margin of error. At step 408, the method 400A includes performing incremental training of the ML model at the first edge node of the peer to peer network, based on the one or more data points by re-applying the one or more data points to generate a new version of incrementally trained ML model at the first edge node. In some embodiments, the data points used by each edge node for incrementally training the machine learning model are not re-used for training. This is verified using a unique encrypted signature that each data item is provided with by the certifying node. In some embodiments, the certifying node 202 verifies the encrypted format of the ML model received from each edge node to verify that any new version of the ML model must be derived from a latest certified model version. The certifying node 202 verifies this using encrypted data that specifies a base model version from which an ML model version was previously derived. In some embodiments, the certifying node 202 imposes a limit on the proportion of an incremental training imparted on the ML model cumulatively contributed by each edge node so that the one or more edge nodes of the peer to peer network of devices 200 are prevented from levying unduly excessive influence by providing updates to the ML model using an abnormally high number of data points. The limit imposed also enables prevention of denial of service (DoS) attacks or any such attempt by any one edge node to flood the peer to peer network with its requests, or submissions of new version of the ML models. At step 410, the method 400A includes transferring the generated new version of the incrementally trained ML model by the first edge node to the certifying node of said peer to peer network. At step 412, the method 400A includes receiving a second certified version of the ML model by the first edge node from the certifying node, where the version of the ML model originates from the first edge node and subsequently the steps 406 to 412 are repeated.

Figure 4B:
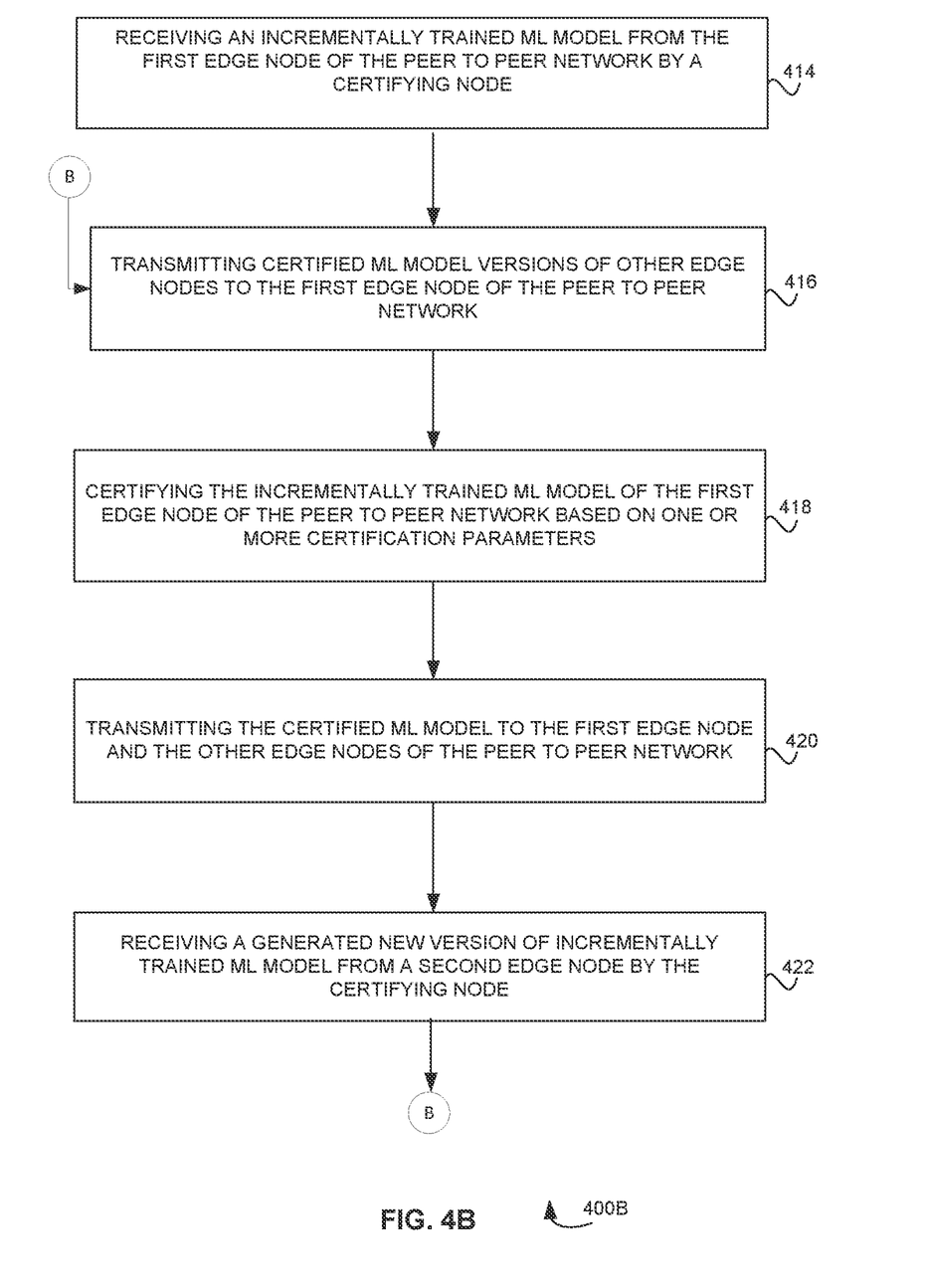
FIG. 4B is a flow diagram that illustrates a method of certification and training a machine learning model at a certifying node in a peer to peer network, according to some embodiments herein.

FIG. 4B is a flow diagram that illustrates a method 400B of certification and training a machine learning model at a certifying node 202 in a peer to peer network of devices 200, according to some embodiments herein. At step 414, the method 400B includes receiving an incrementally trained ML model from the first edge node 102A by the certifying node 202 of the peer to peer network of devices 200. In some embodiments, the incrementally trained ML model includes one or more parameters and one or more weights associated with the one or more parameters. At step 416, the method 400B includes transmitting certified versions of ML model associated with one or more other edge nodes to the first edge node 102A of the peer to peer network of devices 200. At step 418, the method 400B includes certifying the incrementally trained ML model of the first edge node 102A of the peer to peer network of devices 200 based on one or more certification parameters. At step 420, the method 400B includes transmitting the certified ML model to the first edge node 102A and the one or more other edge nodes 102B-N of the peer to peer network of devices 200. At step 422, the method 400B includes receiving an incrementally trained ML model from the second edge node 102B by the certifying node 202 of the peer to peer network of devices 200. Subsequently, the steps 416 to 422 are repeated for the incrementally trained model received from the second edge node.

Figure 5:
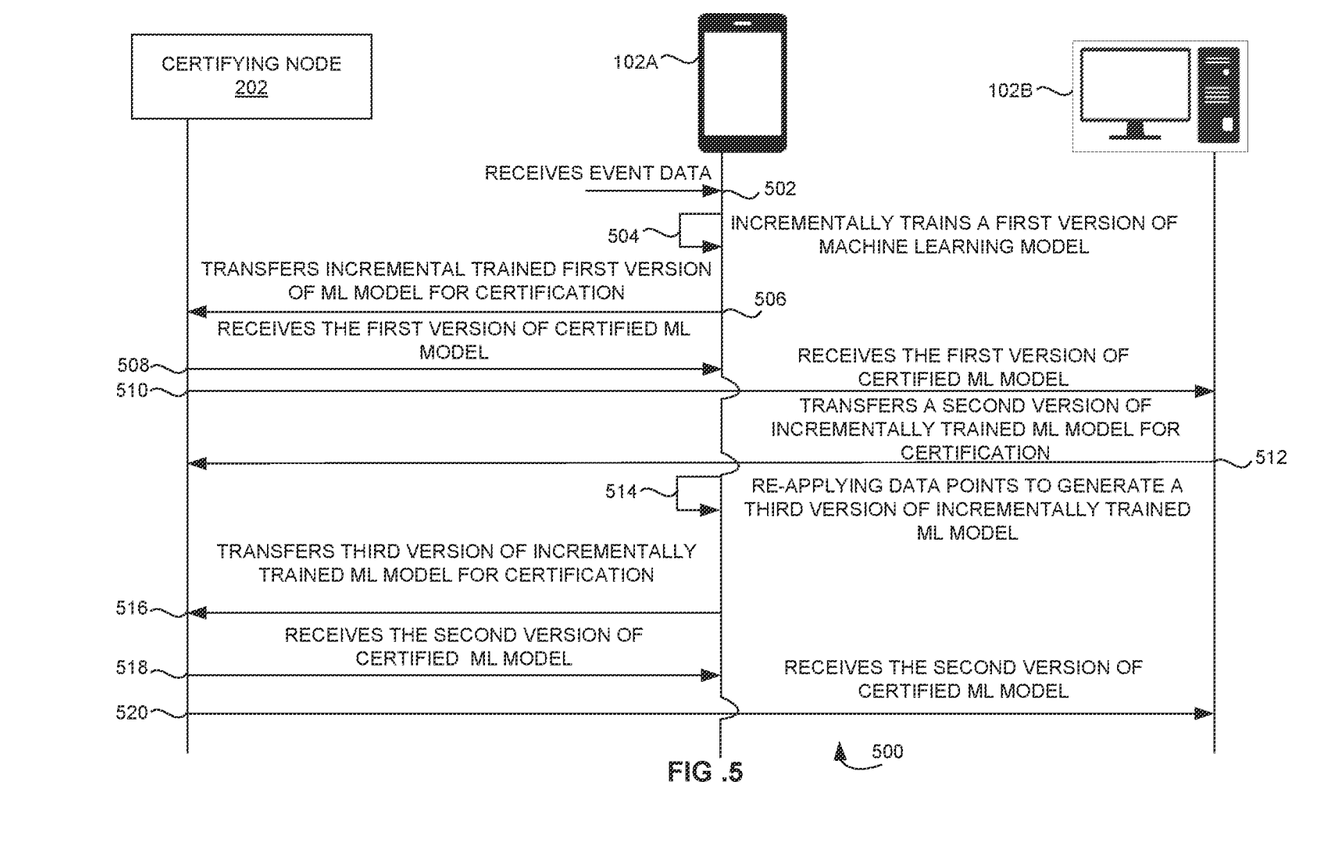
FIG. 5 is an interaction diagram that illustrates a method of concurrent training and updating a machine learning model at an edge node in a peer to peer network, according to some embodiments herein.

FIG. 5 is an interaction diagram that illustrates a method 500 of concurrent training and updating a machine learning model at an edge node 102A in a peer to peer network of devices 200, according to some embodiments herein. At step 502, the method 500 includes receiving event data at the first edge node 102A of the peer to peer network of devices 200 upon occurrence of an event at the first edge node 102A. At step 504, the method 500 includes incrementally trains a first version of a ML model at the first edge node 102A based on the received event data. At step 506, the method 500 includes transferring, the incrementally trained first version of ML model at the first edge node 102A to a certifying node 202 of the peer to peer network of devices 200. The certifying node 202 may be communicatively associated with the one or more edge nodes 102 A-N of the peer to peer network of devices 200 and may be configured to control the incremental training of the ML models in the peer to peer network of devices 200.

At step 508, the method 500 includes receiving a first version of certified ML model from the certifying node 202 by the first edge node 102A. At step 510, the method 500 includes receiving the first version of certified ML model from the certifying node 202 by the second edge node 102B. At step 512, the method 500 includes transferring a second version of the incrementally trained ML model by the second edge node 102B to the certifying node 202 of the peer to peer network of devices 200. At step 514 the method 500 includes re-applying the one or more data points to generate a third version of incrementally trained ML model at the first edge node 102A. At step 516, the method 500 includes transferring the third version of incrementally trained ML model of the first edge node 102A for certification. At step 518, the method 500 includes receiving a second version of certified ML model that is generated after certification from the certifying node 202 to the first edge node 102A. At step 520, the method 500 includes receiving the second version of certified ML model that is generated after certification from the certifying node 202 to the first edge node 102B.

Various embodiments herein enable preservation of user data privacy as the user data stays with the edge node (e.g. user device) and does not get aggregated on any server, thereby eliminating risk of data leaks caused by hacks of a central server. For example, sensitive health signals that are available to an application on a wearable device such as a smart watch may now be used to predict a probability of the user getting a disease, without concerns about sending such sensitive data to a server. Various embodiments enable real-time machine learning to happen in real-time, as soon as a data event occurs on the edge node, thereby improving the quality of the decisions made by the ML model.

In another example, to overcome COVID-19, and other global health challenges, instead of aggregating all user data on a server (i.e. instead of sending the user data to the server having the ML model), the user data stays with the edge node and the ML model of other edge nodes in the peer to peer network is shared with the edge node to incrementally train it. This makes life-and-death decisions on which patients to prioritize, and what treatments they should get. The ML model is shared with each edge node, and learns from their data. Each edge node shares those learnings (not the raw user data), with the other edge nodes in the peer to peer network, and brings together the learnings from all the edge nodes. The process and system disclosed herein deliver high quality personalization as those legacy centralized systems in real-time, so the system can leverage the latest trends, without waiting for a nightly or weekly model training run.

In an example embodiment, the process and system disclosed herein enable the edge nodes to learn from data events throughout their lifecycle. Further, the process and system disclosed herein enables pools learnings from all edge nodes in the peer to peer network, without the need to pool their raw data on a server and shares the learnings between the edge nodes, not user data or raw data. The process and system disclosed herein uses learnings across the edge nodes to predict the lifetime value (LTV) of a new edge node early (i.e. as early as a first-time experience), and with high precision, especially for the mobile application. The edge nodes feed learning data back to tune and optimize their campaigns in a timely manner, in order to reach the target LTV expeditiously. Fax example, even when preserving user data privacy without concerns about sending such sensitive data to a server by moving ML model training and inferencing to the edge node, the edge node may still learn, without needing to aggregate user data on a server, with or without user or device ID's.

The process and system disclosed herein provides peer-to-peer machine learning platform that can provide real time ML based decisions, while preserving the security of user sensitive data. The ML technology performs both model training and decisioning real time, entirely on the edge node, in a federated manner, thereby eliminating the need for aggregating user/edge node data centrally for building ML models. Thus, the user data remain confidential data in the edge node and never need to leave a firewall of the edge node. The learnings from the user data can be combined with similar learnings of other edge nodes in peer to peer network, in order to improve patients' diagnoses.

Figure 6:
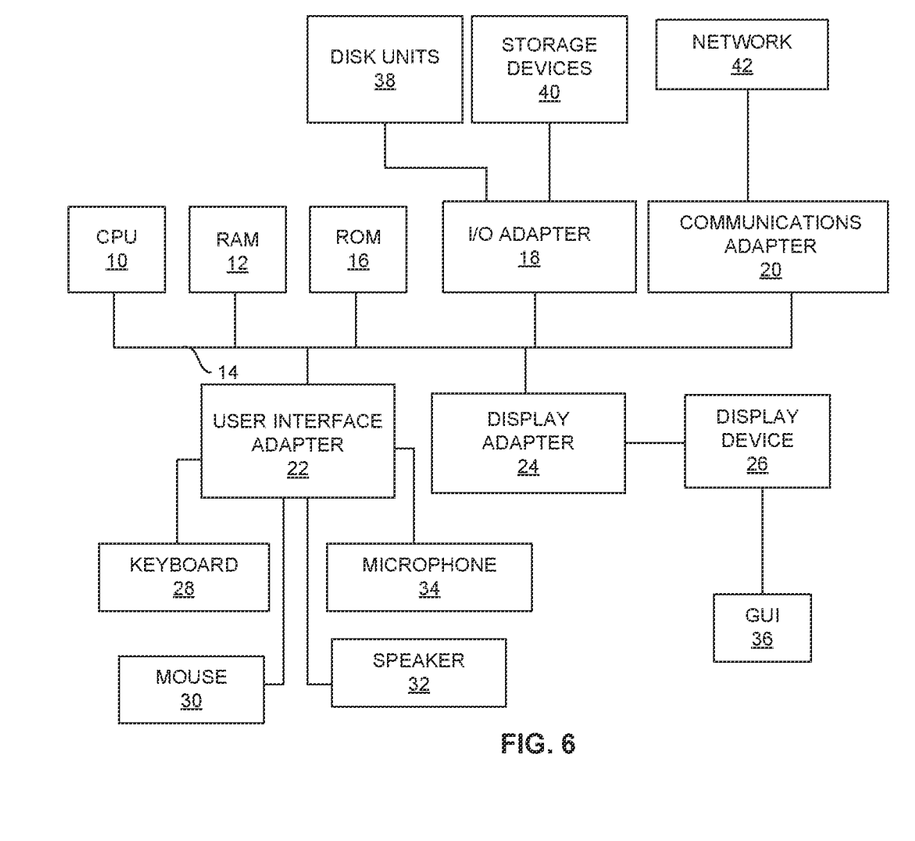
FIG. 6 illustrates an exploded view of a certifying node and/or an edge node configured to perform any one or more of the methodologies herein, in accordance with the embodiments herein.

FIG. 6 illustrates an exploded view of a certifying node and/or an edge node configured to perform any one or more of the methodologies herein. This exploded view illustrates a hardware configuration of a server/computer system/computing device in accordance with the embodiments herein. The system includes at least one processing device CPU 10 that may be interconnected via system bus 14 to various devices such as a random-access memory (RAM) 12, read-only memory (ROM) 16, and an input/output (I/O) adapter 18. The I/O adapter 18 can connect to peripheral devices, such as disk units 38 and program storage devices 40 that are readable by the system. The system can read the inventive instructions on the program storage devices 40 and follow these instructions to execute the methodology of the embodiments herein. The system further includes a user interface adapter 22 that connects a keyboard 28, mouse 30, speaker 32, microphone 34, and/or other user interface devices such as a touch screen device (not shown) to the bus 14 to gather user input. Additionally, a communication adapter 20 connects the bus 14 to a data processing network 42, and a display adapter 24 connects the bus 14 to a display device 26, which provides a graphical user interface (GUI) 36 of the output data in accordance with the embodiments herein, or which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

What is claimed is:

1. A method for operating a first edge node that is configured to be coupled in communication via a peer to peer network with other edge nodes, wherein the first edge node and other edge nodes are configured to train concurrently a machine learning (ML) model at the first edge node, wherein the peer to peer network includes a certifying node to certify the ML model concurrently, wherein the method includes:
   configuring the first edge node to perform an incremental training of a first version of ML model of the first edge node to obtain a first version of incrementally trained ML model, based on a plurality of data points associated with an occurrence of a plurality of data events at the first edge node;
   configuring the first edge node to transfer the first version of incrementally trained ML model to the certifying node for certification, wherein the first version of incrementally trained ML model comprises a plurality of parameters and a plurality of weights associated with the plurality of parameters;

configuring the first edge node to receive a first version of certified ML model associated with a second edge node from the certifying node when the first version of incrementally trained ML model is sent to the certifying node for certification, wherein the certifying node generates the first version of certified ML model associated with the second edge node by certifying a second version of incrementally trained ML model received from the second edge node based on a plurality of certification parameters;

configuring the first edge node to perform retraining on top of the first version of the certified ML model at the first edge node by re-applying the plurality of data points to generate a third version of incrementally trained ML model at the first edge node; and configuring the first edge node to transfer the new version of the third version of incrementally trained ML model by the first edge node to the certifying node of the peer to peer network for certification, thereby enabling concurrent and incremental training of the machine teaming (ML) model.

2. The method of claim 1, wherein the method comprises configuring the first edge node to register to the certifying node for certification of the first version of incrementally trained ML model.

3. The method of claim 1, wherein the method comprises configuring the first edge node to receive an encrypted identifier token from the certifying node as a proof of authenticity for registering with the certifying node.

4. The method of claim 1, wherein the method comprises configuring the first edge node to avoid overwriting of the certified ML model, wherein the certifying node verifies unique metadata associated with the plurality of data points updated to the first version of the certified ML model to generate the third version of incrementally trained ML model.

5. The method of claim 1, wherein the method comprises configuring the first edge node to generate a persistent file format of the first version of incrementally trained ML model by removing one or more details associated with the plurality of data points.

6. The method of claim 5, wherein the method comprises configuring the first edge node to encrypt the persistent file format with a unique signature that corresponds to the first edge node to enable authentication to the other edge nodes to access the first version of incrementally trained ML model.

7. The method of claim 1, wherein the method comprises configuring the first edge node to encapsulate a unique metadata associated with the plurality of data points to restrict the training of the plurality of data points used in the first version of incrementally trained ML model for the third version of incrementally trained ML model.

8. The method of claim 1, wherein the method comprises configuring the certifying node to maintain a record of a number of data points that are used by each of the other edge nodes for the incremental training of the ML model to prevent undue contribution by each of the other edge nodes.

9. A first edge node that is configured to be coupled in communication via a peer to peer network with other edge nodes, wherein the first edge node and other edge nodes are configured to train concurrently a machine learning (ML) model at the first edge node, wherein the peer to peer network includes a certifying node to certify the ML model concurrently, wherein the first edge node is configured to:

perform an incremental training of a first version of ML model of the first edge node to obtain a first version of incrementally trained ML model, based on a plurality of data points associated with an occurrence of a plurality of data events at the first edge node;

transfer the first version of incrementally trained ML model to the certifying node for certification, wherein the first version of incrementally trained ML model comprises a plurality of parameters and a plurality of weights associated with the plurality of parameters;

receive a first version of certified ML model associated with a second edge node from the certifying node when the first version of incrementally trained ML model is sent to the certifying node for certification, wherein the certifying node generates the first version of certified ML model associated with the second edge node by certifying a second version of incrementally trained ML model received from the second edge node based on a plurality of certification parameters;

perform retraining on top of the first version of the certified ML model at the first edge node by re-applying the plurality of data points to generate a third version of incrementally trained ML model at the first edge node; and transfer the third version of the incrementally trained ML model by the first edge node to the certifying node of the peer to peer network for certification, thereby enabling concurrent and incremental training of the machine learning (ML) model.

10. The first edge node of claim 9, wherein the first edge node is configured to register with the certifying node for certification of the first version of incrementally trained ML model.

11. The first edge node of claim 9, wherein the first edge node is configured to receive an encrypted identifier token from the certifying node as a proof of authenticity for registering with the certifying node.

12. The first edge node of claim 9, wherein the first edge node is configured to update the third version of incrementally trained ML model, wherein the certifying node verifies unique metadata associated with the plurality of data points updated to the first version of the certified ML model to generate the third version of incrementally trained ML model.

13. The first edge node of claim 9, wherein the first edge node is configured to generate a persistent file format of the first version of incrementally trained ML model by removing one or more details associated with the plurality of data points.

14. The first edge node of claim 13, wherein the first edge node is configured to encrypt the persistent file format with a unique signature that corresponds to the first edge node to enable authentication to the other edge nodes in the peer to peer network to access the first version of incrementally trained ML model.

15. The first edge node of claim 9, wherein the first edge node is configured to encapsulate unique metadata associated with the plurality of, data points to restrict the training of the plurality of data points used in the first version of incrementally trained ML model for the third version of incrementally trained ML model.

16. The first edge node of claim 13, wherein the first edge node is configured to optimize a payload associated with the persistent file format by including the plurality of parameters and the plurality of weights that crosses above a predetermined configurable threshold, wherein the plurality of weights are associated with the plurality of parameters.

17. The first edge node of claim 16, wherein the payload associated with the persistent file format is optimized by, (i) extracting the plurality of parameters and the plurality of weights associated with the plurality of parameters from specific data items; and (ii) determining if the plurality of weights associated with the plurality of parameters beyond the predetermined configurable threshold.

\* \* \* \* \*